US012629791B2

(12) United States Patent
Kawabata et al.

(10) Patent No.: US 12,629,791 B2
(45) Date of Patent: May 19, 2026

(54) METHOD OF MANUFACTURING MECHANICAL ELEMENT AND MECHANICAL ELEMENT

(71) Applicants: KAWABATA MFG CO., LTD., Tokyo (JP); Tatsuya Takemoto, Kanagawa (JP); Hane Inc., Tokyo (JP)

(72) Inventors: Kodo Kawabata, Tokyo (JP); Tatsuya Takemoto, Kanagawa (JP); Kunio Hane, Tokyo (JP)

(73) Assignees: KAWABATA MFG CO., LTD., Tokyo (JP); Tatsuya Takemoto, Kanagawa (JP); Hane Inc., Tokyo (JP)

( * ) Notice: Subject to any disclaimer, the term of this patent is extended or adjusted under 35 U.S.C. 154(b) by 311 days.

(21) Appl. No.: 18/117,496

(22) Filed: Mar. 6, 2023

(65) Prior Publication Data

US 2023/0321784 A1 Oct. 12, 2023

(30) Foreign Application Priority Data

Mar. 17, 2022 (JP) ................................. 2022-042413

(51) Int. Cl.
  *B24B 7/22* (2006.01)
  *F16C 17/02* (2006.01)
(52) U.S. Cl.
  CPC ................ *B24B 7/22* (2013.01); *F16C 17/02* (2013.01); *F16C 2220/70* (2013.01)
(58) Field of Classification Search
  CPC .. B24B 1/00; B24B 5/42; B24B 5/425; B24B 57/02; B24B 11/00; B24B 11/02;
  (Continued)

(56) References Cited

U.S. PATENT DOCUMENTS 5,527,423 A * 6/1996 Neville ...................... C23F 3/00
                                                          106/3
2011/0239976 A1* 10/2011 Kobayashi ................ B23P 9/02
                                                          123/193.2
(Continued)

FOREIGN PATENT DOCUMENTS

JP      2002122029 A * 4/2002
JP      2003277733 A * 10/2003

OTHER PUBLICATIONS

Translation of JP 2002122029 A (Year: 2002).*
(Continued)

*Primary Examiner* — David S Posigian
*Assistant Examiner* — Steven Huang
(74) *Attorney, Agent, or Firm* — Nakanishi IP Associates, LLC

(57) ABSTRACT

A method of manufacturing a mechanical element includes: a first step of forming a mechanical element that has a sliding surface, which constitutes machinery, by precision machining; a second step of subjecting the sliding surface of the formed mechanical element to surface processing; and a third step of grinding down protrusions on the sliding surface of the mechanical element subjected to surface processing with a grinding agent composition in which ceramic particles are dispersed in oil and embedding the ceramic particles in cavities on the sliding surface of the mechanical element, the ceramic particles each having a hardness higher than a hardness of the mechanical element and being 0.01 μm or more and 0.5 μm or less in particle size.

4 Claims, 2 Drawing Sheets

(58) Field of Classification Search

CPC ...... C09G 1/02; C09K 3/1409; C09K 3/1472; Y10T 29/49282; Y10T 29/497; Y10T 29/49707; Y10T 29/49231; Y10T 29/49233; Y10T 29/49234; Y10T 29/4927; Y10T 29/49272; F01M 7/00; F02B 79/00

See application file for complete search history.

(56) References Cited

U.S. PATENT DOCUMENTS

| | | | |
|---|---|---|---|
| 2014/0051335 A1* | 2/2014 | Morinaga | C09K 3/1463 |
| | | | 451/41 |
| 2015/0176518 A1* | 6/2015 | Uehara | F02F 1/20 |
| | | | 123/193.2 |
| 2017/0175600 A1* | 6/2017 | Douglass | C10M 145/22 |

OTHER PUBLICATIONS

Translation of JP 2003277733 A (Year: 2003).*

Marinescu, Ioan D. Rowe, W. Brian Dimitrov, Boris Ohmori, Hitoshi. (2013). Tribology of Abrasive Machining Processes (2nd Edition). Elsevier. Retrieved from https://app.knovel.com/hotlink/toc/id:kpTAMPE00G/tribology-abrasive-machining/tribology-abrasive-machining (Year: 2013).*

Imetra, "Zirconium Oxide Material Properties", archived Sep. 19, 2020, archived URL: https://web.archive.org/web/20200919063842/https://www.imetra.com/zirconium-oxide-material-properties/ (Year: 2019).*

Surface Engineering Forum, Calculator for Conversion between Vickers Hardness Number and SI Units MPa and GPa (Year: 2025).*

Winterton, R. H. S. (1970). Van der Waals forces. Contemporary Physics, 11(6), 559â574. https://doi.org/10.1080/00107517008202194 (Year: 1970).*

Bozkaya and Sinan, "Effects of Surface Forces on Material Removal Rate in Chemical Mechanical Planarization", Journal of the Electrochemical Society, vol. 157, No. 3 (Year: 2010).*

* cited by examiner (PRECISION MACHINING)

SURFACE OF MECHANICAL ELEMENT
SUBJECTED TO PRECISION MACHINING (SURFACE PROCESSING)

SURFACE OF MECHANICAL ELEMENT
SUBJECTED TO SURFACE PROCESSING (GRINDING AND EMBEDDING TREATMENT)
CERAMIC PARTICLES OF 0.01 $\mu$m TO 0.5 $\mu$m IN PARTICLE SIZE

GROUND SURFACE OF MECHANICAL ELEMENT
WITH CERAMIC PARTICLES EMBEDDED IN CAVITIES

METHOD OF MANUFACTURING MECHANICAL ELEMENT AND MECHANICAL ELEMENT

FIELD

Embodiments of the present invention relate to a method of manufacturing a mechanical element that has a sliding surface, which constitutes machinery such as a bearing, a gearbox, and a chain, and such a mechanical element.

BACKGROUND

For example, bearings are categorized into rolling bearings and slide bearings. The rolling bearing reduces sliding resistance between metal parts by reducing a contact area between rolling elements and races, while the slide bearing reduces sliding resistance by allowing lubricating oil between a metal-to-metal bearing (plain bearing) and a rotating shaft that are in surface contact to prevent two kinds of metals from being in direct contact.

However, current metal surface treatment techniques leave irregularities of machined marks on rolling elements, races, and sliding portions of the plain bearing. In operation, when the specific pressure of the sliding surface exceeds the withstand pressure of the lubricating oil, the oil film is lost and irregularities on metal surfaces come into contact with each other. As a result, friction occurs between metal parts, which leads to seizing phenomena. The phenomena greatly appear not only in rotating portions but also in gears or planar sliding portions such as those between a piston ring and a cylinder. When the oil film is lost and metal surfaces come into direct contact with each other, sliding resistance increases, eventually leading to seizure in the piston ring and a damage and failure in the gears.

To avoid the failure or seizure, it is practice in the rolling bearing to increase the diameter of the rolling element to reduce the specific pressure so that destruction due to direct contact between metals can be avoided. Similarly, in the slide bearing, the diameter of the rotating shaft is increased to reduce the specific pressure so that plane contact can also be addressed by reducing the specific pressure. As a result, these measures lead to an increase in weight, and increased contact area increases sliding resistance, degrading efficiency of the machinery.

SUMMARY

An object is to provide a method of manufacturing a mechanical element and a grinding agent composition, with which smoothness of the mechanical element that has a sliding surface, which constitutes machinery can be improved and surface hardness can be increased.

In an aspect, a method of manufacturing a mechanical element includes: a first step of forming a mechanical element that has a sliding surface, which constitutes machinery by precision machining; a second step of subjecting the sliding surface of the formed mechanical element to surface processing by a buff, a grindstone, or sliding of the mechanical element on another mechanical element; and a third step of grinding down protrusions on the sliding surface of the mechanical element subjected to surface processing with a grinding agent composition in which ceramic particles are dispersed in oil and embedding the ceramic particles in cavities on the sliding surface of the mechanical element, the ceramic particles each having a hardness higher than a hardness of the mechanical element and being 0.01 μm or more and 0.5 μm or less in particle size.

DESCRIPTION OF EMBODIMENTS

A method of manufacturing a mechanical element that has a sliding surface such as a rolling element, a race, a gear, a roller, a bushing, a piston ring, and a cylinder, which constitutes machinery such as a bearing, a gearbox, a chain, and an internal combustion engine according to an embodiment and a mechanical element manufactured in the method will now be described with reference to drawings.

A method of manufacturing a mechanical element according to the embodiment includes: a first step of forming a mechanical element that has a sliding surface, which constitutes machinery by precision machining; a second step of smoothening protrusions on the sliding surface of the formed mechanical element by surface processing such as grinding; and a third step of grinding down protrusions on the sliding surface of the mechanical element subjected to surface processing with a grinding agent composition in which ceramic particles are dispersed in oil and embedding the ceramic particles in cavities on the sliding surface of the mechanical element, the ceramic particles each having a hardness higher than a hardness of the mechanical element and being 0.01 μm or more and 0.5 μm or less in particle size, to increase the level of smoothness of the sliding surface and increase hardness of the surface for less susceptibility to damage.

In a prior art, a roughness of the smoothest superfine-finished surface obtained by cutting a metal material and further subjecting it to surface grinding is 0.025 μm at a minimum in terms of an arithmetic average roughness Ra value, which indicates a differential average from an average of irregularities on the surface, and 0.1 μm in terms of an Rz value, which indicates a difference between the highest tip of protrusions and the lowest bottom of cavities, namely damage.

Figure 1:
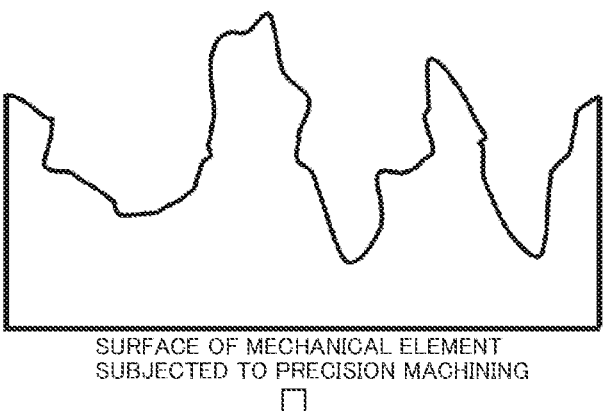
FIG. 1 is a partially enlarged view of a sliding surface of a mechanical element in each step of a method of manufacturing a mechanical element according to an embodiment.
Figure 1:
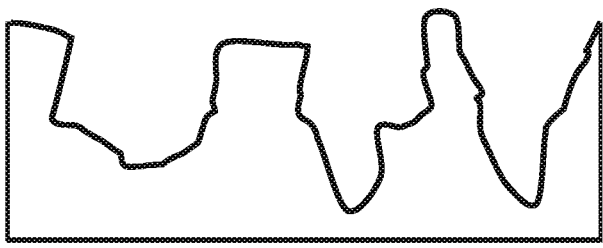
Figure 1:
Figure 1:
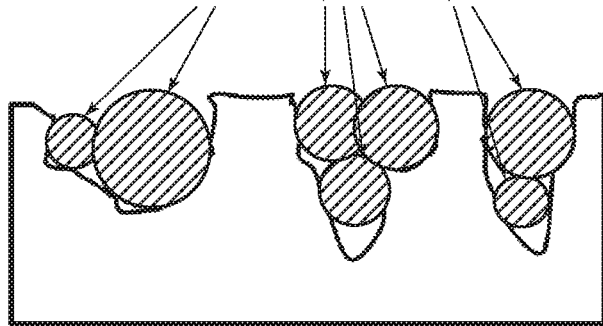

FIG. 1 is a partially enlarged view of a sliding surface of a mechanical element in each step of a method of manufacturing a mechanical element according to the embodiment: the top figure illustrates a surface after precision machining; the middle figure illustrates a surface after surface processing; and the bottom figure illustrates a surface after a grinding and embedding treatment. A mechanical element is formed by precision machining using an arithmetic surface roughness Ra=1.6 μm or less as a target value. Next, the sliding surface of the mechanical element is smoothened by a surface grinding treatment (also referred to as surface processing), which is achieved by a buff, a grindstone, or sliding of the mechanical element on another mechanical element, using 0.4 μm or less of an arithmetic average roughness Ra as a target value. There remain protrusions and cavities on the sliding surface of the mechanical element subjected to surface processing. Then, as a final stage, the protrusions on the sliding surface of the mechanical element are ground down with a grinding agent composition in which ceramic particles are dispersed in oil and the ceramic particles, each of which has a hardness higher than the hardness of the mechanical element, specifically a Vickers hardness of 1,200 HV or more, and is 0.01 μm or more and 0.5 μm or less in particle size, are embedded in the cavities on the sliding surface of the mechanical element.

Particulate zirconium dioxide is suitable for the ceramic particles. The grinding agent composition is made by dispersing and mixing 0.01% or more by weight, or depending on a mechanical element of interest, 25% by weight of ceramic particles in the oil. In use, the grinding agent composition is used as undiluted solution and diluted as appropriate. Grinding down the surface protrusions of the mechanical element and embedding ceramic particles in the cavities can provide a structure with an improved smoothness of the sliding surface and also an improved surface hardness.

Embedding the ceramic particles in the cavities on the mechanical element surface in the grinding treatment exerts a mechanical force on the ceramic particles, which pushes out oxides or oil and fat between surfaces of the ceramic particles and the metal surface of the mechanical element, and deforms underlaying metal with the ceramic particles that have a high hardness at a high pressure. Embedded ceramic particles come into direct contact with an inner surface of the underlaying metal, which means a reduced distance, and as long as the ceramic particles are of an insulating material and small in particle size, the ceramic particles form an electrical double layer with respect to the underlaying metal and are attracted to the underlaying metal by the van der Waals force that is inversely proportional to the sixth power of the distance. As a result, the ceramic particles are unable to be separated from the metal surface by an external mechanical force.

The metal surface covered with the ceramic particles through the surface treatment is smooth and has a high hardness, and thus shows much less wear due to reduced friction. In addition, the heat resistance of the metal surface can be improved when particles that are highly resistant to heat are used.

The durability of the smoothened surface provided by the ceramic particles that have a high hardness is much larger than those of surface treatment agents such as Teflon (registered trademark) group and molybdenum disulfide. Being low in frictional resistance due to small surface free energy of molecules, Teflon based lubricants have a low hardness because they are organic compounds and thus Teflon particles rupture under a high temperature working condition or under a high pressure condition. As a result, the underlaying metal is exposed and wear occurs due to an increased friction. The molybdenum disulfide has a laminated crystalline structure and produces a friction reducing effect by taking advantage of phenomena of the laminated structure flaking off with a small force when attached to a surface of a metal material. While the molybdenum disulfide, which is of inorganic material, is more durable to high temperature than the Teflon based lubricants, the laminated structure flakes away during use, the underlaying metal is exposed, friction increases, and wear occurs with long-term use.

By using ceramic particles that have high hardness and are electrically insulative, the embodiment trims protrusions remaining on the metal surface of the mechanical element formed by precision machining and surface treatment with the ceramic particles for planarization and embeds the ceramic particles in the cavities left on the metal surface of the mechanical element. The embedded ceramic particles are less likely to flake off because of attraction with the metal surface of the mechanical element by the van der Waals force. The ceramic particles exposed on the metal surface increase an apparent surface hardness. To exert the van der Waals force between metal and ceramic particles, it is necessary that both the cavities and the ceramic particles are small. To this end, a surface treatment step is executed after the precision machining step and before the grinding and embedding treatment step.

As a specific implementation, in a case in which the machinery is an internal combustion engine and the mechanical element is a cylinder, the effect of reducing frictional resistance and wear has sufficiently been produced in a long-term operational suitability test in which ceramic particles, each of which is 0.01 μm or more and 0.5 μm or less in particle size and is an electrically insulative particle, are mixed in the engine oil, and planarization of the surface of the cylinder and embedding treatment of the ceramic particles are performed. Accordingly, it has been confirmed that the ceramic particles are embedded in the component surface and smoothing has been achieved.

In a mechanical element such as a rolling element, a race, a plain bearing, and a gear, when the cavities on the surface of the underlaying metal have the same size as the particle size of the ceramic particles or shallower slightly, it is possible to create a structure that is the least likely to cause the ceramic particles to fall off and to form a hard and smooth surface structure. In a case in which the particle size of the ceramic particles is not matched with the roughness of the surface, for example, when the underlaying cavities are much larger than the particle size due to insufficient ground treatment, the structure of the ceramic particles coupled with the underlaying metal does not appear on the surface and a surface that has a high hardness cannot be obtained. In the case of such a surface structure, friction and wear occur due to low surface density on the surface and a large impact of the protrusions of the underlaying metal even when surfaces of the ceramic particles appear in a part of the underlaying metal. However, once wear develops and protrusions are reduced under a condition in which ceramic particles are present, cavities apparently become shallow such that a condition in which ceramic particles are fixed by the van der Waals force is satisfied, leading to planarization of the surface and an increase in surface density of the ceramic particles.

Hence, to prepare a surface structure with small cavities before the grinding and embedding treatment step, a precision machining step is performed using an arithmetic surface roughness Ra 1.6 μm or less as a target value, a surface treatment step is further performed using an arithmetic average roughness Ra 0.4 μm or less as a target value, and the grinding and embedding treatment step is performed by using ceramic particles, each of which is 0.01 μm or more and 0.5 μm or less in particle size.

As described, it is important that the particle size of the ceramic particles is as small as 0.5 μm or less in order to exert the van der Waals force, the ceramic particles have higher hardness than the underlaying metal, and the surface roughness of the underlaying metal is to be fit with the size of the ceramic particles in order to keep the ceramic particles on the metal surface. These conditions are essential to produce the effect of the embodiment.

When the particle size of the ceramic particles is less than 0.01 μm, the ceramic particles may not remain in relatively large cavities on the sliding surface in operation. In this case, the ceramic particles flowing out of cavities are sintered with frictional heat or the like, bonded and transformed into ceramics, so that the sliding surface is abraded and the sliding surface wears. As a result, the friction reducing effect decreases.

In the embodiment, as illustrated in FIG. 1, to improve the level of smoothness of the mechanical element and increase surface hardness, ceramic particles, each of which is harder than a blank metal of the mechanical element and is 0.01 μm or more and 0.5 μm or less in diameter, are used, the ceramic particles are embedded in the surface cavities of the mechanical element, and surface treatment is performed for fixing by the van der Waals force to form a flat and hard surface, which makes it possible to create a surface with reduced friction, which is less likely to wear.

Formation of such a hard and smooth surface structure is performed on the surface of the mechanical element already subjected to precision machining of mechanically abrading the underlaying metal of interest and further to processing for a flat surface that is 0.4 μm or less in terms of the arithmetic average roughness Ra. In the processing for forming the surface structure, metal parts subjected to the similar finish processing are rubbed with each other in liquid such as oil mixed with the particles to achieve planarization and embedding of particles at the same time.

Microscopic irregularities are left on the underlaying metal surface after the machining and surface processing. By grinding treatment in the final stage, the protrusions on the underlaying surface are trimmed and flattened by the ceramic particles that have a high hardness, and the cavities are flattened by the ceramic particles embedded therein depending on their depth and size. The van der Waals force is exerted between the underlaying metal and the particles, and the particles are fixed.

The grinding treatment on the surface of the mechanical element as the final stage is completed in a trial run stage after an actually used component or machinery is assembled as with a rolling element and a race, for example. The ceramic particles that are each 0.01 μm or more and 0.5 μm or less in diameter are dispersed in oil and applied to the metal surface. Alternatively, the component is immersed in oil with the ceramic particles dispersed at a low density and actions such as rotation, contact, or sliding are performed as in actual use. In this way it is possible to apply planarization processing on surfaces of both two metal parts in contact with each other.

Even when mechanical cutting and surface preprocessing of the mechanical element are insufficient, by using oil with the particles as described above dispersed therein and operating the machinery with the components incorporated therein, the protrusions on the underlaying metal surface are ground down with the particles and the particles are embedded in the cavities on the metal surface. The height of protrusions trimmed in the grinding treatment using the particles in this way is within the machining tolerance for the component, which causes no problem due to reduction in dimensions.

In the grinding treatment with the ceramic particles, the particles create a hard and smooth structure in a part or a large part of the surface in a thin layer of 0.5 μm or less on the underlaying metal surface and the structure will be subjected to a stress with a hard surface.

Ball bearings or roller bearings, which are in point contact or line contact, reduce friction, and thus wear, mainly from the effect of hard surface formation, while piston rings or gears, which are in sliding contact, reduce friction, and thus wear, from the effect of reducing the specific pressure and hardening of the contacting smooth surfaces to increase durability. Further, in sliding contact portions, frictional heating is reduced, and degradation of lubricating oil is reduced.

The surface structure finds application in new materials because it has an advantage over Teflon, which is of organic material, and molybdenum disulfide, which is an inorganic compound, in terms of heat resistance, and provides metal surfaces with heat resistance of ceramics, which has an advantage over metal. As a result of the specific effect of the embodiment: reduction in friction and improved durability of bearing portions and sliding contact portions, for bearings not only for small equipment such as an automobile engine but also for a large engine, a generator, and a gas turbine engine, mechanical loss of such rotating machines is reduced, and heat resistance that is excellent over metal is provided for longer life. For a power transmission system such as a gear and a chain, reduction in sliding contact leads to reduction in transmission loss, and is effective for longer life as well as reduction in noise.

Example 1

(Grinding Treatment for Gear of Milling Machine)

Power transmission of gears relies on sliding contact, and includes two cases: in which a tooth tip only slides on a side face of a tooth and in which the side face transmits power while being slid. Accordingly for gears, friction reducing treatment is effective not only on the tooth tip but also on the side face of the tooth. In Example 1, gears of a milling machine are subjected to machining and surface treatment, followed by the grinding and embedding treatment described above as the final step.

The ceramic particles used were made of zirconium dioxide (zirconia; $ZrO_2$) that had a Vickers hardness of 1,200 HV or more and were 0.01 μm or more and 0.5 μm or less in particle size. 200 g of the particles were mixed and sufficiently dispersed in 600 g of base oil without additives to form a grinding agent composition containing 25% particles by weight.

0.6 L of the grinding agent composition was mixed in 60 L of gear oil by 1% by volume while the milling machine was being operated. No-load running (trial run) was performed for 2 hours for achieving a surface treatment in which the particles were to be embedded in teeth and the entire contact surfaces that were responsible for power transmission of the gear. Here, the particles were introduced in the milling machine gear oil in two stages in order to ensure that the particles were dispersed in the oil. For comparative operation of whether the treatment is performed or not, the temperature change of the lubricating oil was measured, and it was confirmed that there was no variation in viscosity.

As for the effect of the grinding treatment achieved by the ceramic particles, the current consumption of the entire milling machine during the no-load running before mixing was 14 ampere and 1.4 kW, while the current consumption after the treatment under the same running conditions was 12 ampere and 1.2 kW, which indicates that power reduction of 21% was achieved.

US 12,629,791 B2

7

Example 2

(Grinding Treatment for Gear of Lathe)

In Example 2, a lathe was used to confirm the effect of the grinding and embedding treatment. The particles used and the procedure for the grinding were the same as those in Example 1. The particles used were ceramic particles made of zirconium dioxide that had a Vickers hardness of 1,200 HV or more and were 0.01 μm or more and 0.5 μm or less in particle size. 200 g of the particles were mixed and sufficiently dispersed in 600 g of base oil without additives to form a grinding agent composition containing 25% particles by weight.

While the lathe is being operated at 95 rpm, 60 cc of the grinding agent composition was added to 3.76 L of gear oil to obtain gear oil of 0.16% by volume of oil as undiluted solution. After no-load running (trial run) for 90 minutes at 950 rpm by using the oil, measurement for the friction reducing effect achieved by the ceramic particles was performed. As in Example 1, it was confirmed that there was no temperature change during the time.

The table below indicates rotational frequencies and improvement effects of current values being reduced before and after the treatment under the condition of no-load running. The friction reducing effect was more significant as the rotation was at a higher speed, and 20% of power reduction at maximum was achieved.

TABLE

| Rotational Frequency (rpm) | Before Treatment (A) | After Treatment (A) | Improvement Effect (%) |
|---|---|---|---|
| 1560 | 9.0 | 7.2 | 20.0 |
| 960 | 7.5 | 6.5 | 13.3 |
| 610 | 7.0 | 6.4 | 8.6 |
| 380 | 6.8 | 6.3 | 6.7 |
| 95 | 6.5 | 6.3 | 3.1 |

Example 3

(Actual Measurement for Grinding Treatment Effect and Element Composition by Surface Roughness Measurement)

In Example 3, the effect of planarization achieved by the ceramic particles was measured. 4 sheets of SK steel without hardening and 4 sheets of hardened SK steel were subjected to machining and surface treatment followed by the grinding and embedding treatment described above as the final step for different time periods. As the effect of the treatment, roughness was measured by a surface roughness tester, and the amount of zirconium on sample surface was measured by X-ray fluorescence spectrometry.

In the treatment, as in Examples 1 and 2, 100 g of ceramic particles made of zirconium dioxide, each of which had a Vickers hardness of 1,200 HV or more and was 0.01 μm or more and 0.5 μm or less in particle size, were mixed and sufficiently dispersed in 300 g of base oil to form a grinding agent composition containing 25% particles by weight. Grinding treatment oil, in which the grinding agent composition was mixed by 25% by volume in low-viscosity mineral base oil without additives, was used for the grinding and embedding treatment.

To quantitatively evaluate results from the surface roughness tester, an arithmetic average roughness Ra, which indicates roughness at a length of 500 μm in terms of deviation from the central value of irregularities on the surface as a difference from the central value, was calculated for evaluation.

In the X-ray fluorescence spectrometry, the sample surface is irradiated with X-ray and the number of elements existing up to the depth to which the X-ray penetrates is measured. Here, the energy of X-ray was set to 50 keV, and percentage (%) of zirconium atoms existing in the penetration depth to underlaying iron was measured.

Both instruments used were owned and managed by Tokyo Metropolitan Industrial Technology Research Institute. The roughness tester is SURFCOM 2900 SD3-12 from Tokyo Seimitsu Co., Ltd. and has the minimum sensitivity of 0.054 μm under measurement conditions.

The X-ray fluorescence spectrometer is JSX-3100 RII from JEOL Ltd., which is able to measure the composition ratio of zirconium under measurement conditions to underlaying iron at a resolution of 1/1000000.

Figure 2:
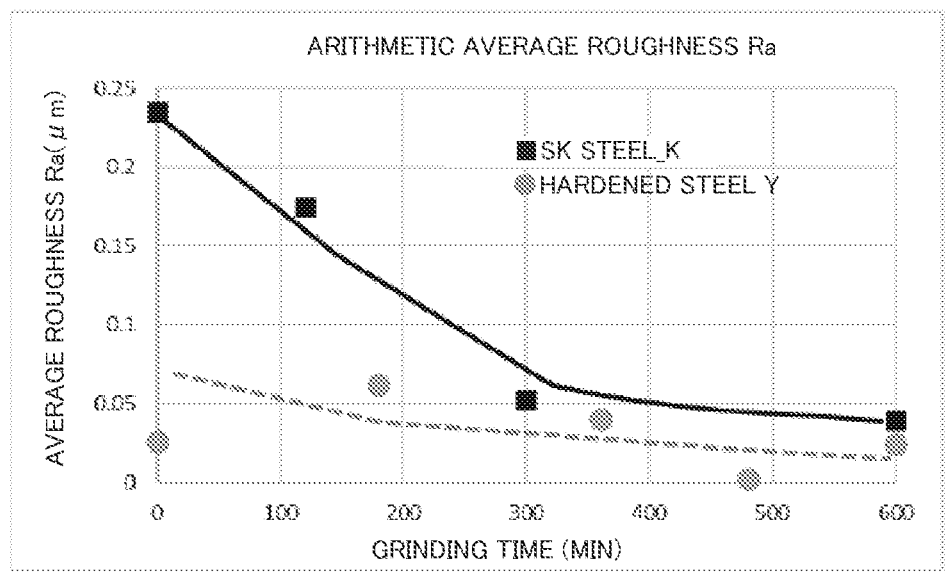
FIG. 2 is a graph representing values of surface roughness "average roughness Ra" of two kinds of samples varying with respect to grinding time in the embodiment.

FIG. 2 is a graph representing grinding time and surface roughness of two kinds of samples in terms of average roughness Ra. The measurement results indicate that, as grinding time passes, protrusions of iron of the sample are trimmed and zirconium dioxide particles are embedded in cavities, reducing Ra values for the surface to achieve planarization.

Figure 3:
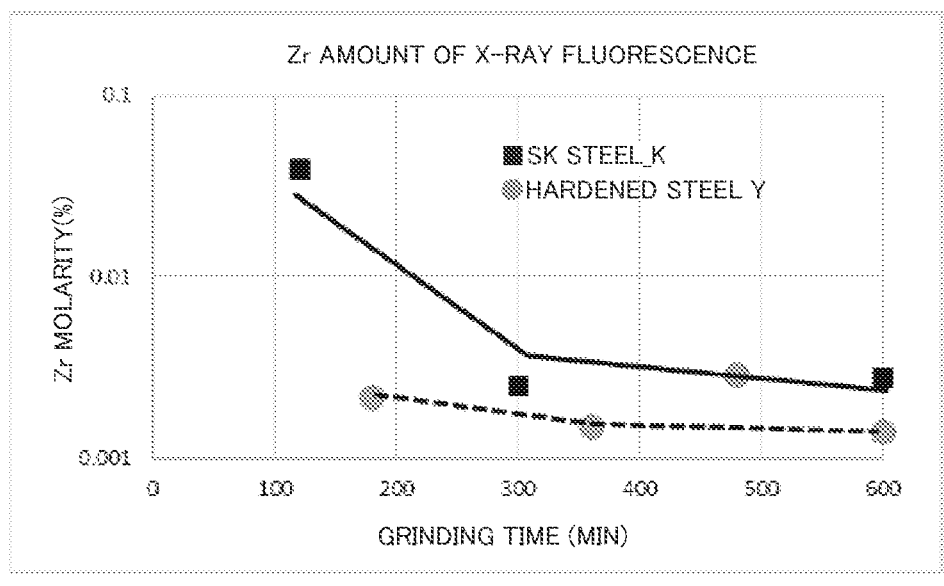
FIG. 3 is a graph representing the molarities of remaining zirconium atoms of two kinds of samples varying with respect to grinding time in the embodiment and indicating that the grinding treatment leaves hard zirconium dioxide on the iron surface.

FIG. 3 indicates grinding time and molarity of remaining zirconium atoms of two kinds of samples, and indicates that the grinding treatment leaves hard zirconium dioxide on the iron surface.

In SK steel without hardening, the Ra values decrease as the grinding time increases, and the amount of zirconium is reduced. This is because, in early phase of the grinding, machined marks on the surface are still large and many particles are embedded and occluded in cavities, while as the grinding time increases, the cavities become shallow, and a reduced number of zirconium is occluded.

Hardened steel sample has been subjected to finish grinding treatment for removing post-hardening thermal strain assuming bearings or gear surfaces before the friction reducing treatment with particles, and thus the surface hardness is high, and Ra values are 0.08 μm to 0.02 μm, which indicates a small amount of stock removal by the particles. However, iron powder generated by grinding with the particles has been visually observed in the base oil, and it can be said that the surface grinding occurred.

In hardened materials, as the friction reducing treatment time increases, the amount of x-ray fluorescence is reduced. As in materials without hardening, this is because as the grinding time increases, the cavities become shallow, and a reduced number of zirconium dioxide is occluded.

In light of the above, not only in materials without hardening but also in materials subjected to hardening and mechanical grinding treatment, zirconium dioxide particles are strongly fixed in fine cavities and gaps on the surface by the van der Waals force, and a hard and flat surface layer of zirconium dioxide is formed on the surface.

Example 4

(Effect During Travel for Automobile and Durability of Surface Treatment Effect)

An automobile engine includes a large number of sliding portions such as of ball bearings, metal-to-metal bearings, gears, and piston rings, all of which can be subjected to the grinding and embedding treatment collectively as the final stage in trial run by mixing the ceramic particles in oil to evaluate the effect of the treatment in terms of fuel consumption.

The automobile used was a diesel engine car with a displacement of 2,600 cc, and a commercial passenger car without modification was used, except that a fuel gauge capable of measure up to 10 cc is attached for fuel consumption measurement.

In the fuel consumption measurement, a flat, 45 km zone is defined on a highway, and the fuel consumption is measured based on the amount of fuel consumed during a round-trip travel at a constant speed of 70 km/h.

The automobile was purchased brand new, and after a trial run or running-in of 2,000 km, the fuel consumption was measured in the specified zone. During oil change, 100 cc of undiluted solution of the grinding agent composition used in Examples 1 and 2 was mixed in 4 L of engine oil. After normal running of 200 km, the grinding agent composition was expelled, which was replaced with new genuine engine oil authorized by the manufacturer, and the fuel consumption measurement was performed in the specified zone. As a result, the fuel consumption was improved by approximately 20%, and the friction reducing effect of the ceramic particles embedded in the cavities was confirmed.

The car was thereafter used on ordinary work, without adding the ceramic particles. At the time of 50,000 km, the same fuel consumption measurement was performed in the specified zone. As a result, reduction in fuel consumption was not observed, nor reduction in the friction reducing effect of the ceramic particles embedded in the cavities.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of manufacturing a mechanical element, comprising:

a first step of forming a mechanical element that has a sliding surface, which constitutes machinery, applying an arithmetic surface roughness Ra=1.6 μm or less as a target value, by precision machining;

a second step of subjecting the sliding surface of the formed mechanical element to surface processing, applying an arithmetic surface roughness Ra=0.4 μm or less as a target value; and a third step of grinding down protrusions on the sliding surface of the mechanical element subjected to surface processing with a grinding agent composition containing ceramic particles with oil, embedding the ceramic particles in cavities on the sliding surface of the mechanical element, and fixing and retaining the ceramic particles in the cavities by a van der Waals force, such that the ceramic particles remain stably in the cavities after completion of the grinding step and during subsequent sliding operation of the mechanical element, wherein the ceramic particles each has a hardness higher than a hardness of the mechanical element and is 0.01 μm or more and 0.5 μm or less in particle size.

2. The method of manufacturing a mechanical element according to claim 1, wherein the ceramic particles are particulate zirconium dioxides.

3. The method of manufacturing a mechanical element according to claim 1, wherein the grinding agent composition is made by mixing particles made of zirconium dioxide, each of which has a Vickers hardness of 1,200 HV or more in oil as the ceramic particles.

4. The method of manufacturing a mechanical element according to claim 1, wherein the grinding agent composition is made by mixing 0.01% or more by weight of the ceramic particles in the oil.

* * * * *